FIG_1

Aug. 11, 1964

C. B. BRAHM 3,144,599

THREE-PHASE STATIC INVERTER

Filed May 20, 1960

INVENTOR
CHARLES B. BRAHM

BY Donald F. Bradley
AGENT

United States Patent Office 3,144,599
Patented Aug. 11, 1964

3,144,599
THREE-PHASE STATIC INVERTER
Charles B. Brahm, Ellington, Conn., assignor to United
Aircraft Corporation, East Hartford, Conn., a corporation of Delaware
Filed May 20, 1960, Ser. No. 30,657
12 Claims. (Cl. 321—7)

This invention relates to an improved power supply system, and particularly to a static inverter which will convert direct current into three-phase alternating current.

An object of this invention is to provide a novel three-phase static inverter and an accurate phase control in which the three phases are precisely displaced 120° from each other.

A further object of this invention is to provide a three-phase static inverter which is accurate over wide variations in temperature and voltage, but which is simple, efficient and inexpensive.

Another object of this invention is to provide a three-phase static inverter which allows accurate control of each phase independently, and in which losses are at a minimum.

These and other objects and a fuller understanding of this invention may be had by referring to the following specification and claims, read in conjunction with the drawings, in which:

Figure 1:
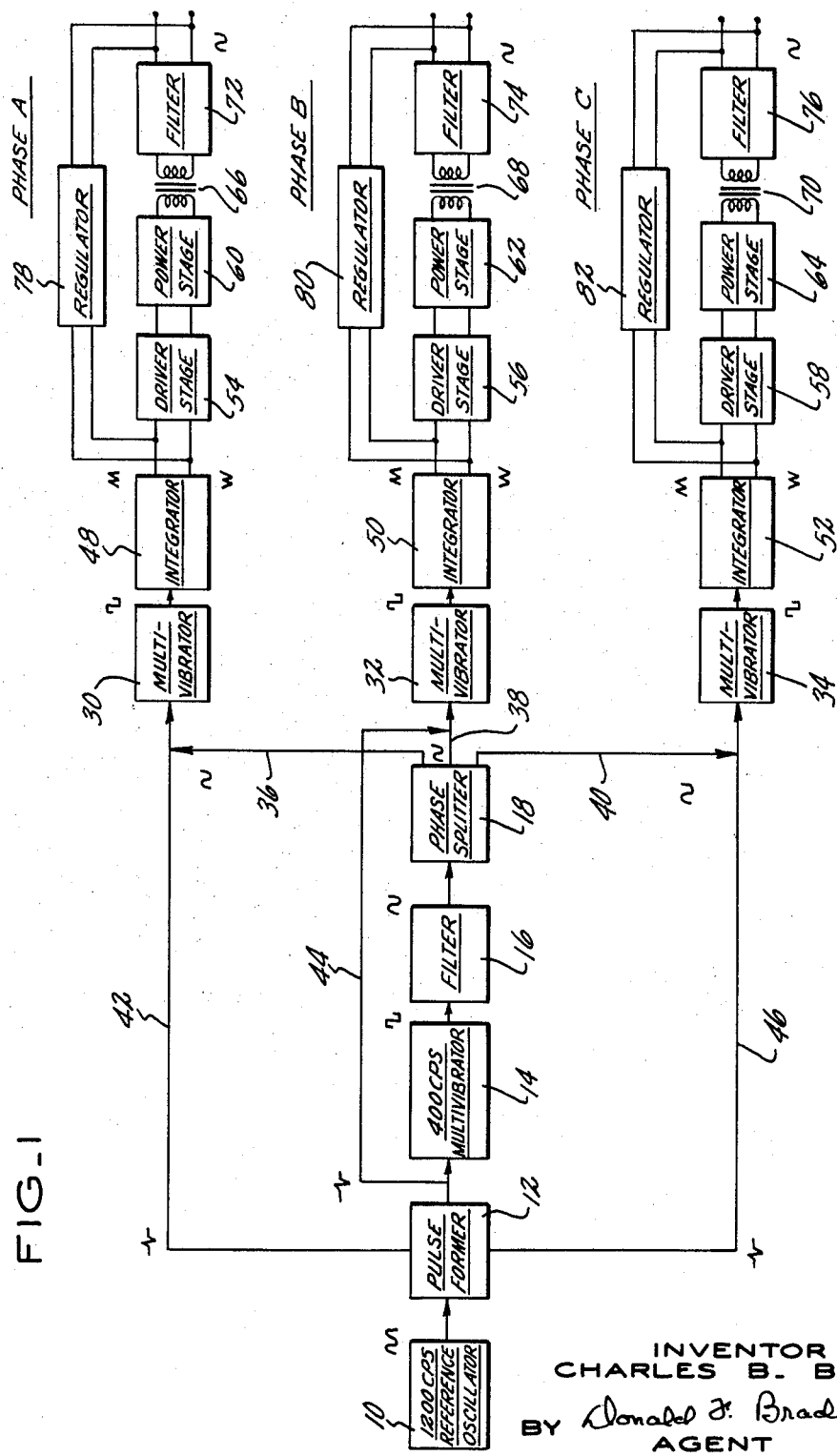
FIG. 1 is a block diagram of the static inverter.

Referring to the block diagram of the static inverter of FIG. 1, a transistorized tuning-fork oscillator 10 operating at 1200 c.p.s. is utilized as the primary reference source which governs the frequency accuracy and phase symmetry of the output of the inverter. Oscillators are available which will maintain the frequency constant to within .005% of 1200 c.p.s. over a temperature range from −55° C. to +125° C.

The choice of a tuning fork instead of a commonly used crystal oscillator as the reference source is advantageous because of the simplification in circuitry which it provides. In order to obtain high accuracy in the static inverter, it would be necessary to operate a crystal oscillator at a high frequency and to count down by means of 5 or 6 binary stages to 400 c.p.s. The reference oscillator necessarily becomes quite complex in that for each binary stage, at least two transistors and several other components are required. A further complication may be encountered if the crystal oscillator requires an oven for temperature stabilization. This would not only add complexity, but would also consume power and appreciably lower the overall efficiency of the inverter. The tuning-fork oscillator 10 provides a simple, straightforward means for obtaining constant frequency, since the entire oscillator employs fewer transistors and requires less power than a corresponding crystal oscillator.

The reference frequency of 1200 c.p.s. was chosen mainly because it is well above the maximum anticipated vibrational frequency of aircraft, for which the inverter is particularly adapted. The reference source should, therefore, be immune from harmful influence by vibration. The 1200 c.p.s. frequency proves ideal not only for frequency synchronization, but for maintaining phase symmetry of the output.

The waveform of the 1200 c.p.s. reference oscillator 10 is converted by pulse former 12 into a series of pulses capable of synchronizing a multivibrator 14, the natural frequency of which is 400 c.p.s. A countdown of three is thus accomplished. As will be described later, the 1200 c.p.s. pulses are also used for initiating the generation of three outputs spaced 120 electrical degrees apart. The prime advantage of this system is simplicity and relative immunity from temperature effects, since phase and frequency are independent of the shifts in properties of components.

Multivibrator 14 may be a basic transistorized free-running or a stable multivibrator, which is a simple two-stage resistance-capacitance coupled transistor amplifier with the output of the second stage coupled back through a capacitor to the base of the first stage transistor. These multivibrators are well known in the art, and will not be described here in detail.

Figure 2:
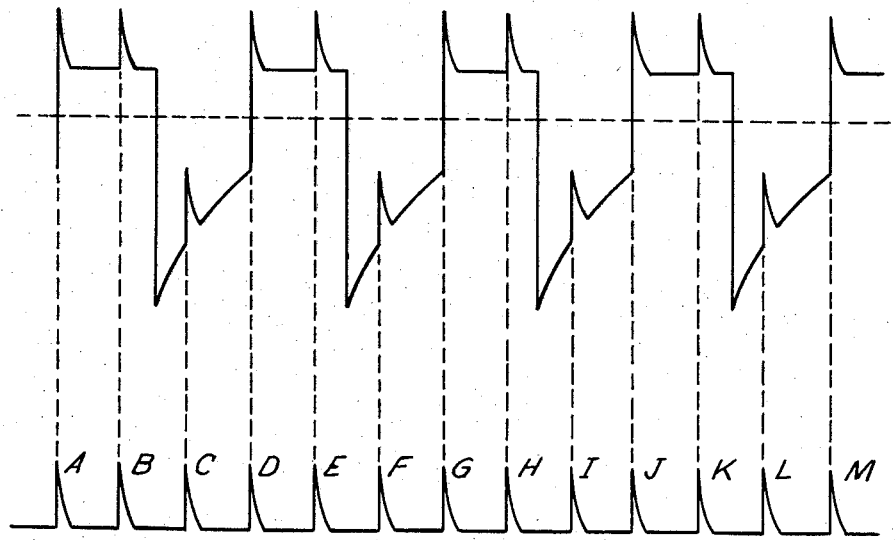
FIG. 2 shows the waveforms which operate the 400 c.p.s. multivibrator of FIG. 1.

The method by which synchronization of multivibrator 14 occurs is illustrated in FIG. 2. The output of the pulse former 12 is a series of pulses A through M, and the multivibrator output waveform is shown directly above these pulses. To follow the synchronization process, consider that pulse A occurs and drives one transistor into conduction. The transistor continues to conduct for a time determined by circuit parameters. During this time pulse B occurs, but has no effect since the transistor is already conducting. Next, the transistor becomes non-conducting for a period again determined by circuit parameters. During this "off" time, pulse C occurs but is ineffectual since the base of the transistor is biased far below cutoff, and the pulse is of insufficient amplitude to cause conduction. Pulse D, however, is able to initiate conduction and occurs three reference oscillator cycles after pulse A. The frequency of multivibrator 14 is thus synchronized at 400 c.p.s. by positive pulses originating by the tuning fork oscillator 10. The frequency of multivibrator 14 is thereby rendered insensitive to temperature changes. Changes in the capacitance or resistance of multivibrator 14 which determine the free-running frequency will result in only slight changes in waveform, since the point at which conduction is initiated in each transistor of the multivibrator is determined by the synchronizing pulses. The output of the multivibrator 14 approximates a square wave.

A simple low-pass filter 16 is used between the output of multivibrator 14 and a phase splitter 18 to eliminate harmonics from the square wave output of multivibrator 14. The filter 16 may consist only of a series inductor followed by a shunt capacitor. Once the harmonics are removed, it becomes possible to shift phase and to produce, from the single phase input, three output signals phased 120 electrical degrees apart.

In order to provide the three phase output from the static inverter, it is necessary to phase split the frequency controlled output of multivibrator 14. Phase splitter 18 converts the incoming signal into a three-phase output, symmetrical with respect to both amplitude and phase.

Figure 3:
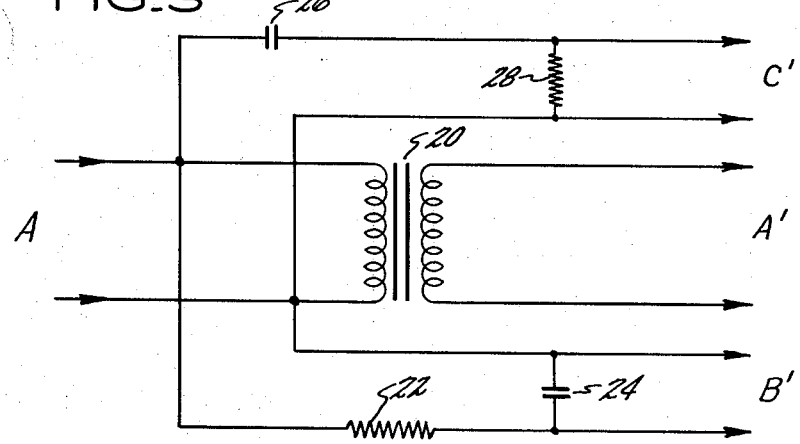
FIG. 3 shows the circuitry of the phase splitter of FIG. 1.
Figure 4:
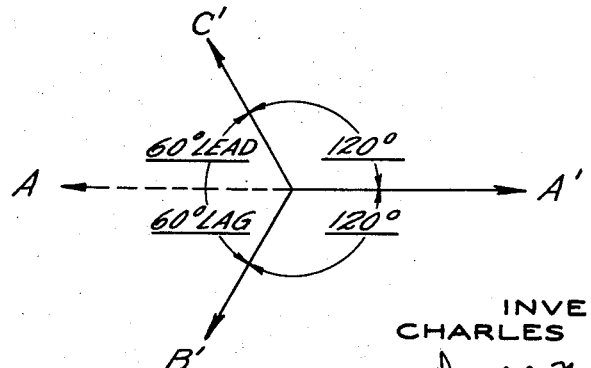
FIG. 4 is a vector diagram of the response of the phase splitting circuit of FIG. 3.

A schematic diagram of phase splitter 18 is shown in FIG. 3. Phase A' is derived from the secondary of transformer 20 and is 180° out of phase with the input signal A. A phase lag of 60° from the incoming signal is provided to phase B' by series resistor 22 and shunt capacitor 24. Although the phase shifted signal B' lags A by 60° it leads A' by 120°. Phase C' is provided in a similar manner except that a phase lead network comprising a series capacitor 26 and shunt resistor 28 is provided. The output of phase lead network leads the input A by 60°, and therefore, lags output A' by 120°.

The output of the phase splitter 18 is sinusoidal. The operation of the voltage regulation circuit, which will be described later, depends upon the generation of a three-phase triangular waveform. In order to arrive at the desired waveform, the output of phase splitter 18 is used to trigger three monostable muitivbrators 30, 32, and 34. The square wave outputs of the multivibrators are, in turn, integrated to provide the proper triangular wave shape. It should be noted also that the square wave outputs of multivibrators 30, 32, and 34, which are 120° out of phase with each other, may be used to provide a three-phase output voltage directly, without the use of regualting circuitry. For example, a simple filter may convert the square wave outputs of the multivbrators directly into a sinusoidal output, and the resulting three phase output will have accurate frequency and phase control. It is obvious, however, that the addition of circuitry for regulating the voltage and power output of each phase independently will greatly enhance the utility of such a power supply.

The multivibrators 30, 32, and 34 are of the conventional "one-shot" type which do not operate until fired by an incoming signal of sufficient amplitude. As may be seen in FIG. 1, each of the three output phases from phase splitter 18 is connected to one of the monostable multivrators through lines 36, 38 and 40.

Pulses from the pulse former 12, which are 1200 c.p.s., are directed to each of the three monostable multivibrators through lines 42, 44, and 46. These 1200 c.p.s. pulses are superimposed on the three-phase outputs from phase splitter 18. The signal used to trigger each of the monostable multivibrators is a composite waveform made up of a 400 c.p.s. sine wave plus a 1200 cycle pulse.

The multivibrators are each fired at a 400 c.p.s. rate, phased 120° apart. The input to each multivibrator from phase splitter 18 is sufficient to trigger the multivibrators and the 1200 c.p.s. pulses are used are used to fire each multivibrator in synchronism with the 1200 c.p.s. pulse and thus prevent deviation from phase symmetry. Assuming that a given 1200 c.p.s. pulse causes multivibrator 30 to fire at a certain instant, the next 1200 c.p.s. pulse causes multivibrator 32 to fire ⅓ of a 400 c.p.s. pulse later or 120° after multivibrator 30. Similarly, a third 1200 c.p.s. pulse will fire multivibrator 34, 240° after multivibrator 30 and 120° after multivibrator 32. Although the technique of frequency synchronization is employed, the ratio of reference frequency to desired power frequency, that is, 1200 c.p.s. to 400 c.p.s., gives immunity from temperature-induced drifts in phase angle by providing phase synchronization.

The output of each monostable multivibrator is converted into a triangular waveform. This may be done by simple integrating circuits 48, 50, and 52 consisting of a series resistor and a shut capacitor.

The regulating portion of the static invertor will be described first with reference to the block diagram of FIG. 1. The triangular output from the integrators is connected to a driver amplifier stage 54, 56, and 58, which raises the signal to a level sufficient for driving the output power stage. The driver amplifiers consist of two stages, a driver preamplifier operated as a saturated amplifier to provide a rectangular wave output which drives a push-pull saturated driver amplifier. The output from the driver stages is a rectangular wave which is coupled to a push-pull power stage 60, 62, and 64. The power stage is a class B amplifier operated in the switching mode. The output of the power stage has a rectangular waveform which is width modulated to provide regulation. Each power stage operates into single phase output transformers 66, 68 and 70, and the transformers are connected to filter networks 72, 74, and 76. The filters may be shunt-m-derived networks and transform the rectangular power stage outputs into a smooth sine wave output. The filter also acts as a transient suppressor in the A.C. line protecting the power stage from load switching transients. The outputs from phases A, B, and C are 120° out of phase with each other. The frequency of the output has been kept constant by the synchronization process in multivibrators 30, 32, and 34. Since the amplitude of the output waves is dependent upon the load on each phase, regulation is provided by sensing the output waveform and feeding a D.C. error signal back to the input of driver stages 54, 56, and 58 and varying the D.C. level of the triangular input to the driver stages. FIG. 1 shows regulators 78, 80, and 82 as performing this operation.

Figure 5:
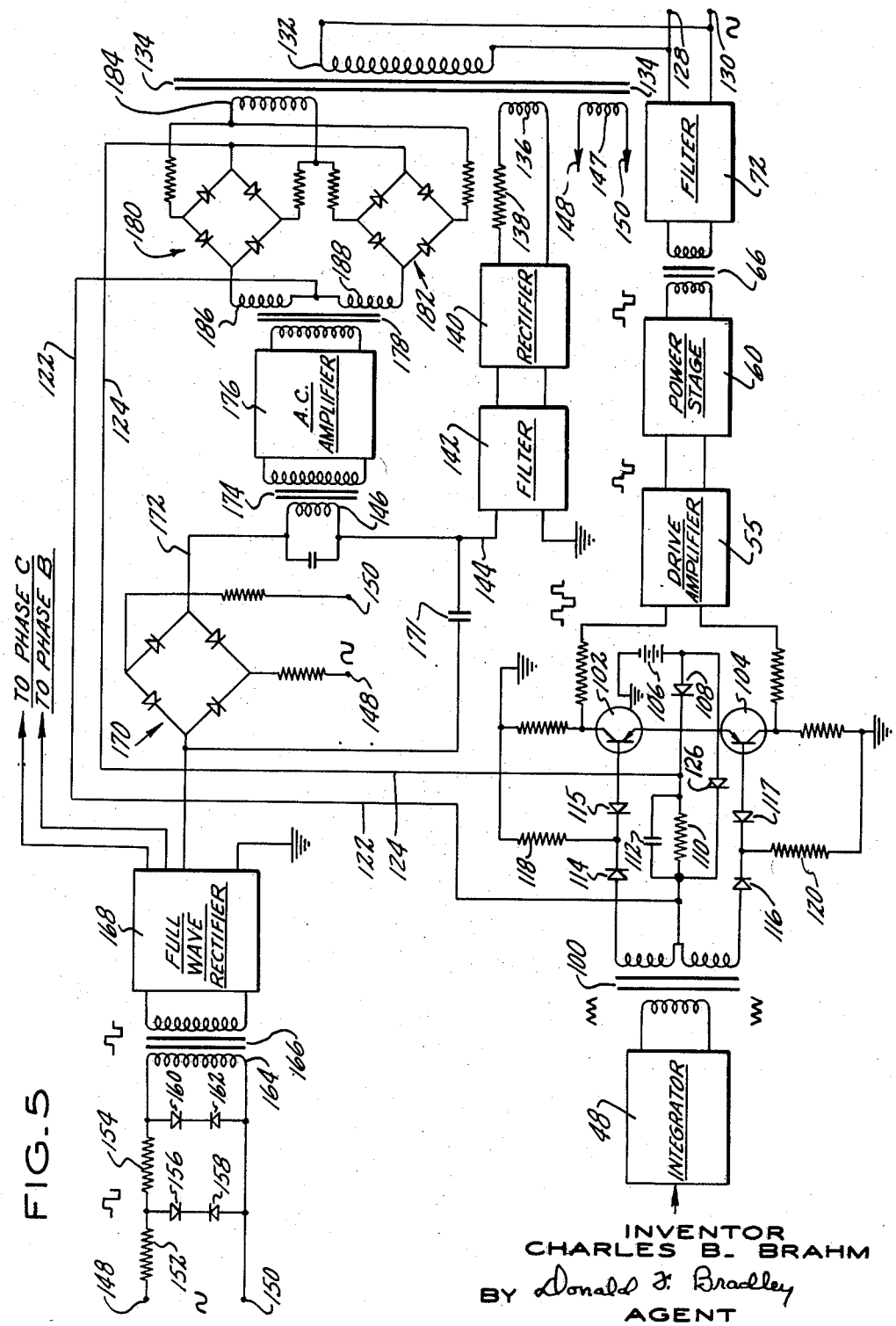
FIG. 5 shows the circuitry of the power stage and regulator of FIG. 1.

FIG. 5 shows in detail the operation of the regulators. The operation will be described only for phase A but it will be understood that the same operations are applicable to each phase. Integrator 48 supplies the triangular wave to transformer 100, and the secondary of the transformer is coupled through diodes 114, 115 and 116, 117 to the base junctions of PNP transistors 102 and 104. This is the driver pre-amplifier stage. These transistors are operated as saturated amplifiers in order to provide a rectangular output. Voltage and power regulation are provided by varying the length of time each transistor conductors. This is known as pulse width modulation.

The triangular waveform is the signal which switches the transistors 102 and 104 into and out of conduction. The length of conduction time can be varied if the base line of the triangular wave is moved up or down with respect to a fixed "firing line." A D.C. component can be applied to the triangular wave and varied upward to increase conduction time or lowered to shorten conduction time. An increase in conduction time is equivalent to an increase in power. A source of positive D.C. voltage 106 provides a positive potential to the emitters of the transistors through a temperature compensating diode 108. A path is provided through resistor 110 and capacitor 112 and through the secondary winding of transformer 100, diodes 114, and 116 and resistors 118 and 120 to ground, thus keeping the base connections of transistors 102 and 104 more negative than the emitters, and consequently the transistors will be turned slightly on at all times but with limited current flow. This allows the triangular input to turn the transistors fully on more easily. When the triangular input is applied to the bases of the transistor, one of the transistors will turn on fully and saturate, while the other transistor will be turned off. When the triangular input wave reverses, the transistor which was conducting will now be turned off, while the off transistor turns fully on. The length of time that each transistor is conducting is determined by the triangular input as modified by the D.C. bias provided to the bases of each transistor. If the bias is low, that is, if the base-emitter junction of the transistor is only slightly forward biased, the triangular input wave will turn the transistors on only for a short time, whereas when the bias is high, the transistor will be turned on for a much longer period of time by the same triangular input wave. The output of the transistor is rectangular and is connected to the driver amplifier stage 54. As will be described later, a D.C. error voltage is applied through lines 122 and 124 across resistor 110 and filtering capacitor 112 to vary the D.C. bias of transistors 102 and 104, and thus regulate the conduction time of each transistor. The pulse width output of the transistors 102 and 104 will always be slightly less than 180°. If, however, the D.C. error voltage calls for conduction time greater than 180°, diode 126 will conduct and prevent the conduction time of the transistors from being more than 180°. Diode 126 will thus protect the system from overloading.

Although transistors 102 and 104 have been described as PNP transistors, it is obvious that the principles described apply also to NPN transistors as well.

The driver amplifier 55 may be another stage of push-pull saturated transistors turned on and off by the rectangular output from transistors 104 and 102. The output from the driver amplifier is connected to the power stage 60, which may be a transistorized class B amplifier operated in the switching mode. The rectangular output from power stage 60 is coupled through transformer 66 to filter 72 where it is converted into a smooth sine wave. The filter 72 is a shunt-*m*-derived network.

The sinusoidal output is sensed across the output terminals 128 and 130 and fed to primary winding 132 of transformer 134. The output voltage is stepped down to obtain a value compatible with the reference voltage to be described later. Secondary winding 136 is connected through a resistor 138 to a full wave rectifier 140 where the A.C. output voltage is converted to direct current. The rectifier output is filtered at 142 and the D.C. signal is connected through line 144 to one side of primary winding 146. This D.C. signal will be proportional to the amplitude of the sinusoidal output voltage and is compared across the primary winding 146 to a reference voltage and any deviation of the output voltage from this reference signal will be measured and fed back to change the bias of transistors 102 and 104 to increase or decrease their conduction time and thus modify the output voltage to eliminate the deviation.

The reference voltage is provided by using the original output across terminals 128 and 130 and sensing this output across transformer 134 by secondary winding 147. The terminals of secondary winding 147, terminals 148 and 150, will supply this regulated output through resistors 152 and 154 in order to divide the voltage. A pair of double-anode zener diodes 156 and 158 are placed back to back across the secondary winding and provide additional coarse regulation and clipping of the sine wave. An additional pair of zener diodes 160 and 162 are placed across the line to clip the wave again and to provide additional "fine" regulation. Zener diodes 160 and 162 in the "fine" regulating stage are operated at a constant current at which their temperature coefficient of voltage is practically zero. The regulation results in a square wave output across primary winding 164. The square wave is coupled through transformer 166 to a full wave rectifier circuit 168. Filtering may be necessary at this point. The D.C. output of this rectifier will supply the regulated voltage to all three phases, so that it is not necessary to duplicate the circuitry for the other two stages in order to provide a source of reference voltage. The source of sinusoidal voltage is used as the original reference voltage because it is regulated itself, thus simplifying the other stages of regulation provided by the zener diodes.

The D.C. reference voltage is conducted to one side of a diode modulator bridge circuit 170 and a source of alternating voltage which may be from winding 147 of transformer 134 is used to change the bridge from a high impedance to a low impedance at a 400 cycle rate. The source of A.C. voltage is indicated at terminals 148 and 150. Diode bridge circuit 170 is thus used as a switch, and the D.C. reference voltage is conducted through the bridge circuit when the bridge circuit is in its conducting or low impedance state. This reference voltage is conducted through line 172 to the other side of primary winding 146 to which the D.C. output signal is connected. If the D.C. output signal is the same as the reference voltage no signal will result across primary winding 146; however, if the output signal is above or below its desired value, the D.C. signal will differ from the D.C. reference voltage and a rectangular A.C. output will result across primary winding 146, the direction and magnitude being proportional to the error between the desired output as indicated by the reference voltage and the actual output. This rectangular wave is coupled through transformer 174 to A.C. amplifier 176 and to transformer 178.

More than one stage of A.C. amplification may be necessary to bring the error voltage to a level at which it can regulate effectively. A pair of phase sensitive diode demodulators 180 and 182 are supplied by a reference A.C. voltage from secondary winding 184. The error voltage output from A.C. amplifier 176 through transformer 178 will be sensed by secondary windings 186 and 188 and applied to the demodulators 180 and 182. The operation of diode demodulators is well known in the art and will not be described in detail here. The demodulators will convert the A.C. error voltage to a D.C. signal whose magnitude and direction are proportional to the deviation of the sinusoidal output voltage from the desired value, and this D.C. voltage will be conducted through lines 122 and 124 to modify the bias of transistors 102 and 104 and thus change the voltage level of the triangular wave and the conduction time of the transistors which will result in regulating the output voltage across terminals 128 and 130. The sinusoidal output is thus kept constant regardless of the load or changes in operating conditions.

Voltage and power regulation of the static inverter is assured by the pulse width modulation method of regulation independent of the frequency, and frequency regulation is assured by the novel method of synchronization. The inverter as described will thus provide a simple and efficient method of producing a three-phase power supply system.

The pulse width modulator and regulating system is more fully described and claimed in a copending application entitled "Pulse-Width Modulator," application Serial No. 30,545, by the same inventor and filed on even date with this application.

While the invention has been described in its preferred embodiment, the invention is not limited thereto and changes in the details of construction and the combination and arrangements of parts may be resorted to without departing from the spirit and scope of the invention.

I claim:

1. A power supply system comprising means to produce a first signal at a selected frequency, a multivibrator synchronized by said first signal for producing a second signal having a frequency which is a sub-multiple of said first signal, converting means connected to receive said second signal and to produce therefrom a plurality of phase-displaced voltage signals, a plurality of output circuits, means for applying at least one of said plurality of phase displaced voltage signals to each of said output circuits to actuate said output circuits, and means for simultaneously applying said first signal to said output circuits to synchronize the actuation of said output circuits.

2. A three-phase power supply system comprising means to produce a first signal at a selected frequency, means synchronized by said first signal for producing a second signal having a frequency which is a sub-multiple of said first signal, circuit means receiving said second signal and producing therefrom first, second and third voltage signals, each of said voltage signals being displaced in phase 120° from the other said voltage signals, first, second and third output circuits, means for applying at least one of said voltage signals to each of said output circuit to actuate said output circuits, and means for simultaneously applying said first signal to said output circuits to synchronize the actuation of said output circuits.

3. A three-phase power supply system as in claim 2 in which the output circuits are monostable multivibrators triggered by said voltage signals.

4. A three-phase power supply system as in claim 3 in which said circuit means for producing voltage signals from said second signal comprises a phase splitting circuit including a transformer having a primary winding and a secondary winding, and a phase lead circuit and a phase lag circuit each connected across said transformer primary winding.

5. A three-phase power supply system as in claim 4 in which the means to produce said first signal includes an oscillator.

6. A three-phase power supply system as in claim 5 in which said means for producing said second signal is a free-running multivibrator synchronized by the output from said oscillator, the second signal being a rectangular wave which is fed to the primary transformer winding of said phase splitting circuit.

7. A power supply system comprising means to produce a series of timed pulses, means receiving said series of pulses and producing therefrom a plurality of voltage signals phase displaced 120° from each other, a plurality of monostable multivibrators, means applying one of said voltage signals to each of said multivibrators to trigger said multivibrators and to produce an output signal from said multivibrators, and means simultaneously applying said series of timed pulses to each of said multivibrators to synchronize the triggering of said multivibrators.

8. A power supply system as in claim 7 and including means for regulating the amplitude of the output signal from each said multivibrator.

9. A power supply system as in claim 8 in which the output signal from each multivibrator is converted into a triangular wave.

10. A power supply system as in claim 9 and including a pulse width modulator for receiving each said triangular wave and producing a rectangular signal having a pulse width proportional to the voltage level of said triangular wave.

11. A power supply system as in claim 10 and including means to convert said rectangular signal into a sinusoidal voltage.

12. A power supply system as in claim 11 and including means for varying the voltage level of said triangular wave as a function of the amplitude of the sinusoidal voltage.

References Cited in the file of this patent

UNITED STATES PATENTS

| | | |
|---|---|---|
| 2,596,167 | Philpott | May 13, 1952 |
| 2,623,203 | Demuth | Dec. 23, 1952 |
| 2,648,722 | Bradley | Aug. 11, 1953 |
| 2,898,412 | Linn | Aug. 4, 1959 |
| 2,899,572 | Skelton et al. | Aug. 11, 1959 |
| 2,916,687 | Cronin | Dec. 8, 1959 |

OTHER REFERENCES

"Transistorized Three-Phase Power Supplies," by W. Brannian, published in Electronic Industries (January 1959); pages 02-05 relied on.